Figure 1:
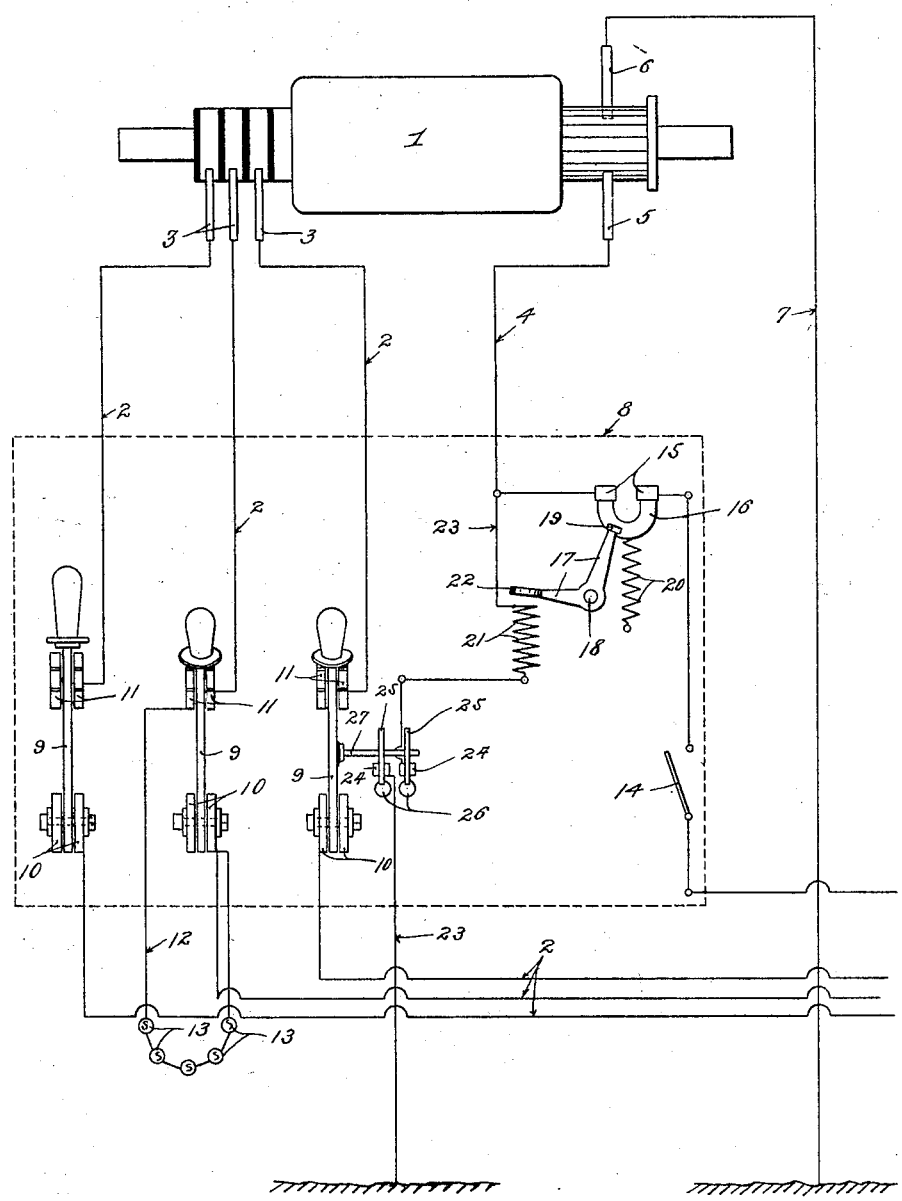

No. 649,526. Patented May 15, 1900.
J. PEARSON.
SAFETY SYNCHRONIZING DEVICE.
(Application filed July 3, 1899.)

(No Model.) 3 Sheets—Sheet 1.

Witnesses,
Mabel M. McGary
Harry Kilgore

Inventor,
John Pearson.
By his Attorney,
Jas. F. Williamson

No. 649,526. Patented May 15, 1900.
J. PEARSON.
SAFETY SYNCHRONIZING DEVICE.
(Application filed July 3, 1899.)
(No Model.) 3 Sheets—Sheet 2.

Witnesses.
Harry Kilgore,
F. D. Merchant.

Inventor.
John Pearson,
By his Attorney,
Jas. F. Williamson

No. 649,526. Patented May 15, 1900.
J. PEARSON.
SAFETY SYNCHRONIZING DEVICE.
(Application filed July 3, 1899.)
(No Model.) 3 Sheets—Sheet 3.

Witnesses.
Harry Kilgore
F. D. Merchant

Inventor.
John Pearson,
By his Attorney,
Jas. F. Williamson

UNITED STATES PATENT OFFICE.

JOHN PEARSON, OF MINNEAPOLIS, MINNESOTA, ASSIGNOR OF ONE-HALF TO JAS. F. WILLIAMSON, OF SAME PLACE.

SAFETY SYNCHRONIZING DEVICE.

SPECIFICATION forming part of Letters Patent No. 649,526, dated May 15, 1900.

Application filed July 3, 1899. Serial No. 722,623. (No model.)

*To all whom it may concern:*

Be it known that I, JOHN PEARSON, a citizen of the United States, residing at Minneapolis, in the county of Hennepin and State of Minnesota, have invented certain new and useful Improvements in Safety Synchronizing Devices; and I do hereby declare the following to be a full, clear, and exact description of the invention, such as will enable others skilled in the art to which it appertains to make and use the same.

My invention has for its object to provide a simple and efficient device for synchronizing rotary converters and safely connecting them in circuit with the alternating generators while the latter are in action; and to these ends my invention consists of the novel devices and combinations of devices hereinafter described, and defined in the claims.

As is well known to persons familiar with modern alternating-current-power transmission, the generators of the primary alternating current are usually and preferably run in parallel, so that the group delivers its power as a single unit, giving the aggregate or combined output of the several generators. In electric railways and other systems in which motors are to be driven a rotary converter is connected in circuit with the alternating system for the purpose of delivering a direct current to the motors. The common and most feasible way of starting the converter has been to connect and speed it as a direct-current shunt-motor and then to connect the same into the alternating-current circuit by closing the proper switch or switches at the very instant when running in synchronism and phase with the alternators or primary generators. Successful synchronizing on the above plan and with the mechanism hitherto provided depends partly upon the conditions of the system and partly upon the skill of the operator, and when either is unfavorable disastrous results are very liable to follow. The switch or switches for connecting the converter with the alternating-current circuit may be closed in several different ways; but for rapidity, convenience, and other reasons it has been found most desirable, as above stated, to close the switches at the very instant when the converter is brought into synchronism while under direct-current control. This is also the most dangerous way. With the generators running in parallel, the converter being small in comparison, it has been found the more consistent with safety to cut out the converter from the direct current an instant before it is connected into the alternating-current circuit. This action when successfully carried out is from all points of view the most approved manner of putting the converter under the control of the main alternating current. Hitherto the above manipulation of the switches or devices for closing and opening the circuits has been performed by hand—that is, independent hand actions have been required, one to open the main-circuit breakers in the direct-current circuit and the other to close the alternating-current switches. These independent hand actions are subject to two inherent dangers—to wit, that the direct current will be cut out too soon or too late. If the direct current be cut out too late, then the too-early closing of the alternating circuit will cause sparking and burning at various points and will be liable to throw some of the other converters of the system out of step. If the direct current be cut out too soon, the belated closing of the alternating current will permit the converter to drop below step or speed, so that the subsequent closing of the alternating circuit will cause disturbances frequently sufficient to throw the whole system out of phase. By my invention I avoid the disadvantages above noted and secure the desired action by means whereby the closing of the alternating switch or switches will automatically operate the circuit-breaker in the direct-current circuit with the properly-timed action to cut out the direct current.

My invention is illustrated in the accompanying drawings, like characters indicating like parts throughout the several views.

Figure 2:
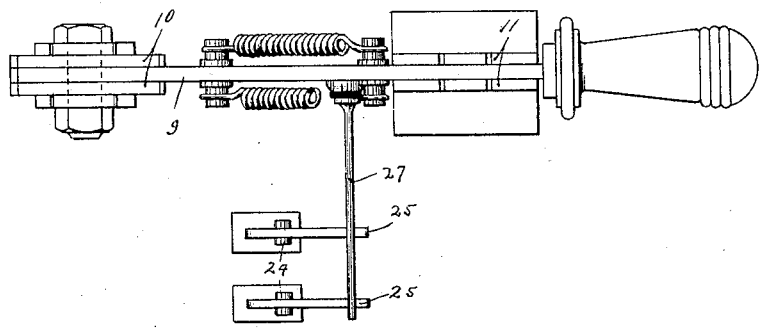
Figure 4:
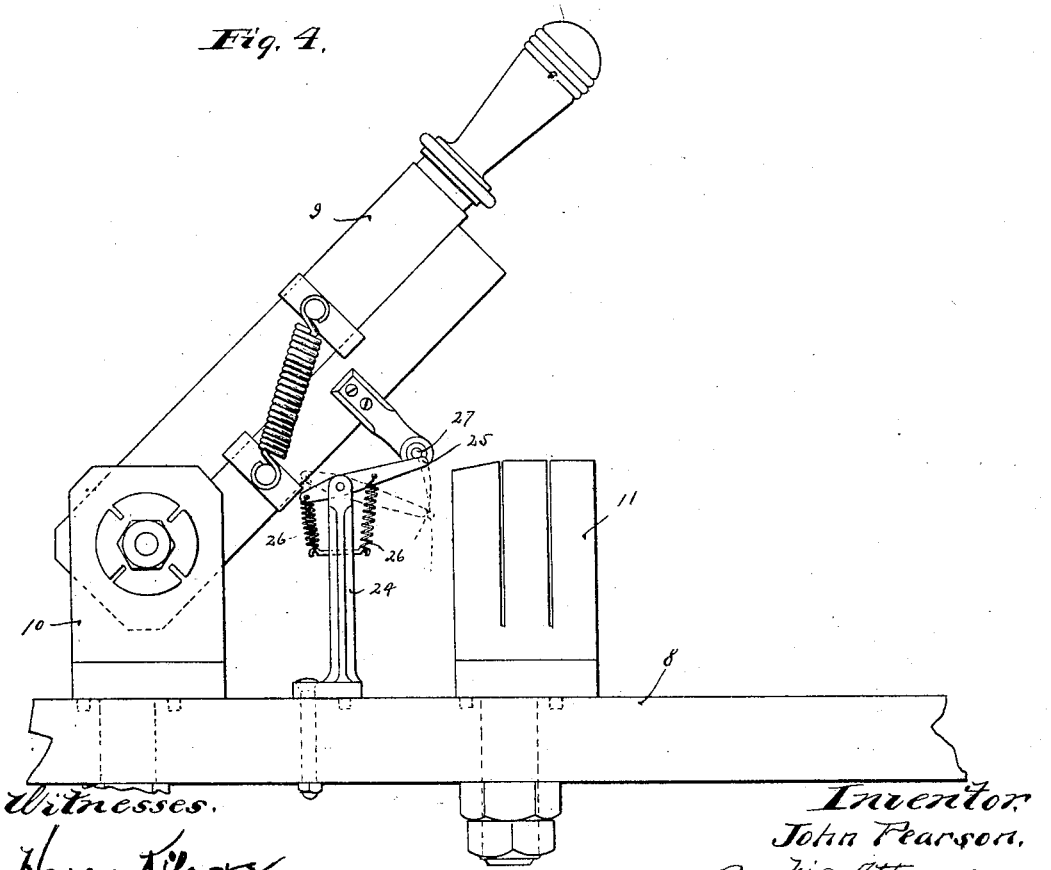
Figure 3:
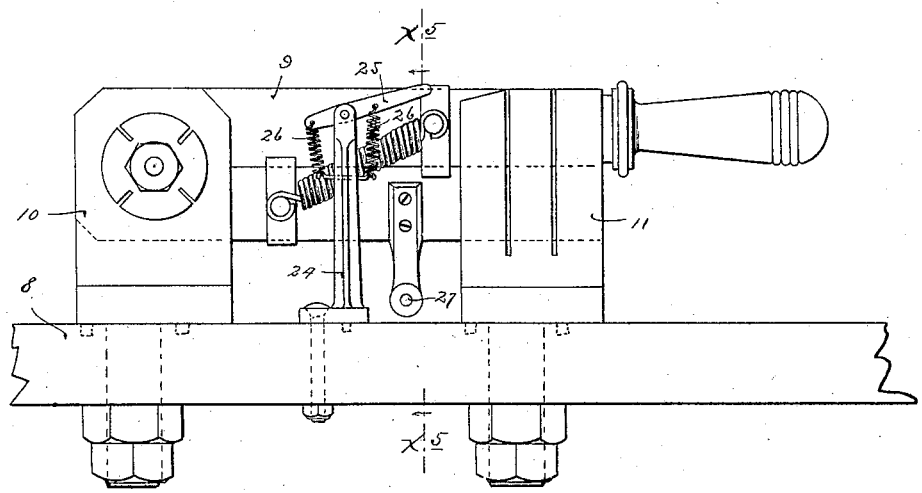
Figure 5:
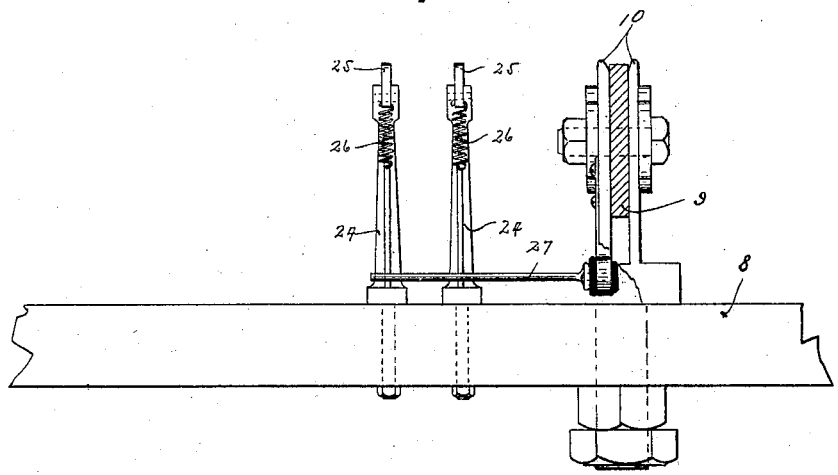

Figure 1 is a diagram view illustrating the conductors and the general relations of the parts embodying my invention. Fig. 2 is a plan view of one of the switches for closing the main alternating-current circuit. Fig. 3 is a view in side elevation, showing the said switch in its closed position. Fig. 4 is a similar view to Fig. 3, but with the switch-lever shown as nearly, but not quite, closed, in which position it has just closed the trip-circuit for opening the circuit-breaker in the direct-current circuit; and Fig. 5 is a transverse vertical section taken approximately on the line $x^5$ $x^5$ of Fig. 3.

In the diagram view, Fig. 1, the rotary converter is indicated by the numeral 1, and the numeral 2 indicates the three leads of a three-phase alternating circuit supplied from an alternating-current generator or from a group of alternating-current generators run in parallel. The numerals 3 indicate the three brushes of the three leads 2. The numeral 4 indicates the supply-conductor of the direct-current circuit. The numeral 5 indicates the brush to which the conductor 4 is attached, and the numeral 6 indicates a coöperating brush which is grounded by a wire 7. The switchboard 8 is indicated by dotted lines in Fig. 1. The three switches for the three leads 2 of the three-phase alternating-current circuit are of the ordinary construction, except for an attachment to one of them, to be hereinafter noted, and they are mounted in the ordinary way on the switchboard 8. They each comprise switch-levers 9, contact-lugs 10, between which said levers 9 are pivoted, and bifurcated contacts 11, between the jaws of which the free ends of the levers 9 are adapted to be engaged and disengaged to make and break the circuit. The leads 2 are, as is also customary, sectioned and connected at their separated ends to the contacts 10 and 11 of their corresponding switches. Between the contact-pieces 10 and 11 of one of the switches, (as shown the central switch,) a small shunt-circuit 12, having a series of lamps 13, is connected in the ordinary manner and for the usual purpose hereinafter noted. In the direct circuit 4 is interposed a switch 14, and at another point the said wire 4 is sectioned and terminates at its sectioned ends in contact-pieces 15. The circuit between the contact-pieces 15 is normally closed by a circuit-breaker 16. The circuit-breaker 16 is shown as normally held in position by one arm of a bell-crank trip-lever 17, which is pivoted at 18 and engages a lug 19 on the said circuit-breaker. The said circuit-breaker is under tension from a strong spring 20, so as to move into its open position when released from the lever 17. A magnet 21 is positioned to act upon the armature end 22 of the trip-lever 17. This magnet 21 is, as is shown and preferred, connected in a grounded shunt 23 from the direct circuit 4. At the proper point, adjacent to one of the switches 9, the shunt-wire 23 is sectioned and terminates in contact-posts 24, that are rigidly secured to the switchboard 8. Extending parallel to each other and pivoted one to the end of each contact-post 24 are contact-levers 25, each of which is subject to the action of a pair of centering-springs 26, which normally hold the same in the intermediate positions indicated by full lines in Fig. 3 and 4. The adjacent switch-lever 9, which in this construction is the right-hand member, is provided with a laterally-projecting contact finger or rod 27, which is well insulated therefrom and by the closing movement of the said lever is adapted to be brought into contact with the free ends of the contact-levers 25, thereby closing the circuit through the shunt 23 and the trip-magnet 21.

Operation: We will assume that the converter is idle or standing still and that both the alternating-current circuit and the direct-current circuit are open, the circuit-breaker 16 being in its closed position and the switch 14 being open. Without changing these conditions one of the switches 9 may be closed, as shown at the left in the diagram view, Fig. 1. Attention is here called to the fact that in Fig. 1 two of the levers 9 are shown in perspective, indicating that they are turned up or raised, as shown in Fig. 4. Also the small lamp-circuit wire 12 may be made to connect the contact-pieces 10 and 11 of the central switch, with the sole result that the lamps 13 will be lighted. To start the converter as a direct-current shunt-motor, the switch 14 should be closed. The switch 14 may be in the nature of a rheostat, or other means may be provided in the direct circuit whereby the flow of the current through the wire 4 may be varied, so as to readily control the speed of the converter while being driven as a motor by the direct current. When the converter has been speeded into synchronism and phase with the alternating current, the lamps 13 will become dark, thus indicating to the operator the proper time at which to close or connect in the two remaining switches of the alternating-current circuit. This final closing of the alternating-current circuit is accomplished by simultaneously closing the right-hand and intermediate switch-levers 9. As the right-hand switch-lever 9 reaches the position indicated by full lines in Fig. 4, in which position it is nearly but not quite closed, the contact-finger or circuit-closer 27 carried thereby will contact with the free ends of the contact-levers 25 and will thus close the trip-circuit through the shunt 23 and the trip-magnet 21. The magnet 21 being energized will attract the armature end 22 of the trip-lever 17, and thereby move the other end of the same from engagement with the lug 19 on the circuit-breaker 16, and the circuit-breaker being thus released will be instantly thrown into its open position by the spring 20, thus opening the direct-current circuit. In this manner it is obvious that the direct current is thrown out of action an instant in advance of the closing of the alternating-current circuit. The contact-finger 27 will, under the continued closing movement of the lever 9, move the contact-levers 25 approximately to the position indicated by dotted lines in Fig. 4; but by the time the switch-lever has reached its closed position the said finger 27 will be moved out of engagement with the said levers 25, and they will then be permitted to assume their normal positions, so that the shunt-wire 23 will remain normally broken or open. When the right-hand switch-lever 9 (reference being had to Fig. 1) is moved from its closed into its open position, the contact-finger 27 will engage the levers 25 through the intermediate portion of its movement, but will permit them to assume their normal positions before it has reached its extreme open position.

It should be understood that the circuit-breaking device in the direct-current circuit and the trip for actuating the same may take any suitable form. In fact, the mechanism usually employed as the circuit-breaker varies somewhat from the illustration given. However, the device illustrated is simple and operative and serves the purpose intended. It should be further understood that the construction above described is capable of many modifications within the broad scope of my invention. For example, it would be within the scope of my invention, although not the full equivalent of the electrically-operated trip device for the circuit-breaker in the direct-current circuit, to provide a mechanical connection between the said circuit-breaker and the switch in the alternating-current circuit. It would also be within the scope of my invention, although probably by no means as good construction as the arrangement described, to provide means for operating the circuit-breaker in the direct-current circuit by hand and to make this operation automatically close the alternating-current circuit with the properly-timed action.

What I claim, and desire to secure by Letters Patent of the United States, is as follows:

1. A rotary converter having direct-current leads and alternating-current leads and interdependent circuit-controllers for said leads, whereby the actuation of the one will cause the actuation of the other, substantially as described.

2. A rotary converter having alternating-current leads and direct-current leads and interdependent circuit-controllers for said leads timed with respect to each other, whereby the said circuit-controllers will be brought into operation successively, substantially as described.

3. A rotary converter having direct-current leads and alternating-current leads and interdependent circuit-controllers for said leads timed with respect to each other in such manner that the opening of the one shall precede the closing of the other, substantially as described.

4. The combination with a converter having alternating and direct circuit connections, of a switch or switches in said alternating circuit, and a circuit-breaker in said direct circuit, controlled by one of the movable parts of said alternating switch, substantially as described.

5. The combination with a rotary converter having alternating and direct current circuit connections, of a switch or switches in said alternating circuit, and an electrically-controlled circuit-breaker in the said direct circuit, controlled by one of the movable parts of said alternating switch, substantially as described.

6. The combination with a rotary converter, having alternating and direct current circuits, of a switch or switches in the alternating circuit, a circuit-breaker in the direct circuit, and an electrical trip for said circuit-breaker, involving a trip-magnet and a trip-circuit which is normally open, and a contact-piece for closing said trip-circuit, carried by the movable part of one of said alternating switches, substantially as described.

7. The combination with a rotary converter having alternating and direct current circuits, of a switch or switches in said alternating circuit, a circuit-breaker normally closing said direct circuit, and a trip for said circuit-breaker involving a shunt from the direct circuit, a trip-magnet in said shunt, contact-pieces normally breaking said shunt-circuit, and a contact-piece carried by the movable part of one of said switches and coöperating with said contact-pieces to close said shunt-circuit and open said direct circuit, substantially as described.

8. The combination with a rotary converter having alternating and direct current circuits, of a switch or switches in said alternating circuit, involving each a pivoted switch-lever, an electrically-controlled circuit-breaker in said direct circuit, and an electrical trip for said circuit-breaker involving a shunt from the direct circuit, a trip-magnet in said shunt, the pivoted contact-pieces normally breaking said shunt-circuit and yieldingly held in intermediate positions, and a projecting contact-piece carried by one of the levers of said alternating-circuit switches and movable into contact with the said pivoted contact-pieces, substantially as described.

In testimony whereof I affix my signature in presence of two witnesses.

JOHN PEARSON.

Witnesses:
ROSE T. CHASE,
FRANK D. MERCHANT.